United States Patent
Zagaynov et al.

(10) Patent No.: US 12,354,397 B2
(45) Date of Patent: Jul. 8, 2025

(54) DETECTING FIELDS IN DOCUMENT IMAGES

(71) Applicant: ABBYY Development Inc., Dover, DE (US)

(72) Inventors: Ivan Zagaynov, Dolgoprudniy (RU); Vasily Loginov, Moscow (RU); Stanislav Semenov, Moscow (RU); Aleksandr Valiukov, St. Petersburg (RU)

(73) Assignee: ABBYY Development Inc., Dover, DE (US)

( * ) Notice: Subject to any disclaimer, the term of this patent is extended or adjusted under 35 U.S.C. 154(b) by 0 days.

(21) Appl. No.: 18/502,343

(22) Filed: Nov. 6, 2023

(65) Prior Publication Data

US 2024/0078828 A1     Mar. 7, 2024

Related U.S. Application Data

(62) Division of application No. 17/384,985, filed on Jul. 26, 2021, now Pat. No. 11,893,818.

(30) Foreign Application Priority Data

Jul. 21, 2021    (RU) ................................ 2021121680

(51) Int. Cl.
*G06V 30/416*     (2022.01)
*G06F 18/21*      (2023.01)
(Continued)

(52) U.S. Cl.
CPC ........ *G06V 30/416* (2022.01); *G06F 18/2163* (2023.01); *G06F 18/22* (2023.01);
(Continued)

(58) Field of Classification Search
CPC ... G06F 18/2163; G06F 18/22; G06V 30/416; G06V 30/18143; G06V 30/18152;
(Continued)

(56) References Cited

U.S. PATENT DOCUMENTS 7,636,565 B2    12/2009   Owen
9,201,957 B2    12/2015   Turdakov
(Continued)

FOREIGN PATENT DOCUMENTS

| CN | 103559191 B | 9/2016 |
| CN | 110728151 A | 1/2020 |
| RU | 2487403 C1 | 7/2013 |

OTHER PUBLICATIONS

Sun, W. and Kise, K., Similar Manga Retrieval Using Visual Vocabulary Based on Regions of Interest, 2011 International Conference on Document Analysis and Recognition, 1075-1079, http://www.iapr-tc11.org/archive/icdar2011/fileup/PDF/4520b075.pdf.
(Continued)

*Primary Examiner* — Casey L Kretzer
(74) *Attorney, Agent, or Firm* — Lowenstein Sandler LLP

(57) ABSTRACT

A method of detecting fields in document images includes: receiving a codebook comprising a set of visual words, each visual word corresponding to a center of a cluster of local descriptors; calculating, based on a set of user labeled document images, for each visual word of the codebook, a respective frequency distribution of a field position of a specified labeled field with respect to the visual word; loading a document image for extraction of target fields; calculating a statistical predicate of a possible position of a target field in the document image based on the frequency distributions; and detecting, using the trained model, fields in the document image based on the calculated statistical predicate.

20 Claims, 9 Drawing Sheets

(51) Int. Cl.
*G06F 18/22* (2023.01)
*G06T 5/30* (2006.01)
*G06T 5/40* (2006.01)
*G06V 10/46* (2022.01)
*G06V 30/18* (2022.01)

(52) U.S. Cl.
CPC .............. *G06T 5/30* (2013.01); *G06T 5/40* (2013.01); *G06V 10/462* (2022.01); *G06V 30/18143* (2022.01); *G06V 30/18152* (2022.01); *G06T 2207/20076* (2013.01); *G06T 2207/30176* (2013.01)

(58) Field of Classification Search
CPC ........... G06V 10/462; G06T 5/30; G06T 5/40; G06T 2207/20076; G06T 2207/30176
See application file for complete search history.

(56) References Cited

U.S. PATENT DOCUMENTS

| | | | |
|---|---|---|---|
| 9,547,807 B2 | 1/2017 | Vidal Calleja | |
| 9,652,688 B2 | 5/2017 | Jean | |
| 9,922,270 B2 | 3/2018 | Song | |
| 2011/0196859 A1 | 8/2011 | Mei | |
| 2017/0364594 A1 | 12/2017 | Chen | |
| 2018/0203928 A1* | 7/2018 | Ching | G06F 16/316 |
| 2020/0019768 A1 | 1/2020 | Chen | |
| 2020/0027215 A1* | 1/2020 | Li | G06T 15/10 |
| 2020/0380254 A1* | 12/2020 | Zeng | G06V 10/82 |

OTHER PUBLICATIONS

Mokhtar, Sahar Abd El Hameed and Elnemr, Heba Ahmed, Department of Computers and Systems, Electronics Research Institute, A Comparative Study of Data Mining approaches for Bag of Visual Words Based Image Classification, Oct. 8, 2017, 14 pages.
Leutenegger, Stefan, et al., Autonomous Systems Lab, "BRISK: Binary Robust Invariant Scalable Keypoints", 8 pages, [retreived from the internet: Jul. 22, 2021].
Scikit-image, "Niblack and Sauvola Thresholding" 2 pages, [retreived from the internet: Jul. 22, 2021].
Takeda, Kazutaka et al., 2011 International Conference on a Document Analysis and Recognition, "Real-Time Document Image Retrieval for a 10 Million Pages Database with a Memory Efficient and Stability Improved LLAH", 2011, 5 pages.
Loginov et al, "Document Data Extraction System Based on Visual Words Codebooks" (published in Document Analysis Systems, 14th IAPR International Workshop, pp. 356-370, Jul. 2020) (Year: 2020).
Qi et al, "Image Classification Model Using Visual Bag of Semantic Words" (published in Pattern Recognition and Image Analysis, vol. 29, No. 3, pp. 404-414, 2019) (Year: 2019).
Lu et al, "Image classification by visual bag-of-words refinement and reduction" (published at https://arxiv.org/abs/1501.04292 , Jan. 2015) (Year: 2015).
Diamant et al, "Task-Driven Dictionary Learning Based on Mutual Information for Medical Image Classification" (published in IEEE Transactions on Biomedical Engineering, vol. 64, No. 6, pp. 1380-1392, Jun. 2017) (Year: 2017).

* cited by examiner

DETECTING FIELDS IN DOCUMENT IMAGES

RELATED APPLICATIONS

This application is a divisional of U.S. patent application Ser. No. 17/384,985, filed Jul. 26, 2021, which claims priority under 35 USC § 119 to Russian patent application No. RU2021121680, filed on Jul. 21, 2021. Both above-referenced applications are incorporated by reference herein.

TECHNICAL FIELD

The implementations of the disclosure relate generally to computer systems for analyzing document and, more specifically, to systems and methods for generating and optimizing codebooks for the detection of fields in a document.

BACKGROUND

Image processing tasks may involve the use of codebooks of visual words based on or analogous to the Bag-of-Words (BoW) model. For example a codebook of visual words can be used for searching or classifying images. However, automatic extraction of information using a codebook can be challenging due to the complex structure and layout of documents with varied positions of text, fields, images, tables, etc. and possibly ambiguous locations of boundaries of these elements.

SUMMARY OF THE DISCLOSURE

Implementations of the present disclosure describe mechanisms generating and optimizing codebooks for the detection of fields in a document image.

method of generating and optimizing a codebooks for document analysis includes: receiving a first set of document images; extracting a plurality of keypoint regions from each document image of the first set of document images; calculating local descriptors for each keypoint region of the extracted keypoint regions; clustering the local descriptors such that each center of a cluster of local descriptors corresponds to a respective visual word; generating a codebook containing a set of visual words; and optimizing the codebook by maximizing mutual information (MI) between a target field of a second set of document images and at least one visual word of the set of visual words.

A system generating and optimizing a codebooks for document analysis includes a memory, and a processor operatively coupled to the memory, the processor configured to: receive a first set of document images; extracting a plurality of keypoint regions from each document image of the first set of document images; calculate local descriptors for each keypoint region of the extracted keypoint regions; cluster the local descriptors such that each center of a cluster of local descriptors corresponds to a respective visual word; generate a codebook containing a set of visual words; and optimize the codebook by maximizing mutual information (MI) between a target field of a second set of document images and at least one visual word of the set of visual words.

A method of document analysis includes: receiving, by a processing device, a codebook comprising a set of visual words, each visual word corresponding to a center of a cluster of local descriptors; calculating, based on a set of user labeled document images, for each visual word of the codebook, a respective frequency distribution of a field position of a specified labeled field with respect to the visual word; loading a document image for extraction of target fields; detecting visual words in the document image; calculating a statistical predicate of a possible position of a target field in the document image based on the frequency distributions; and detecting, using the trained model, fields in the document image based on the calculated statistical predicate.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

FIGS. 2A-2D illustrate bounded rectangles of iteratively larger maximally stable extremal regions (MSER) extracted from a document image, where FIG. 2A depicts an original document image, FIG. 2B depicts extracted MSERs having an area that is smaller than 0.005 of the image area, FIG. 2C depicts extracted MSERs having an area that is smaller than 0.01 of the image area FIG. 2D depicts extracted MSERs having an area that is smaller than 0.05 of the image area, in accordance with an implementation of the present disclosure.

FIG. 5 illustrates a set of document images with low variability, in accordance with some implementations of the present disclosure.

DETAILED DESCRIPTION

Figure 1:
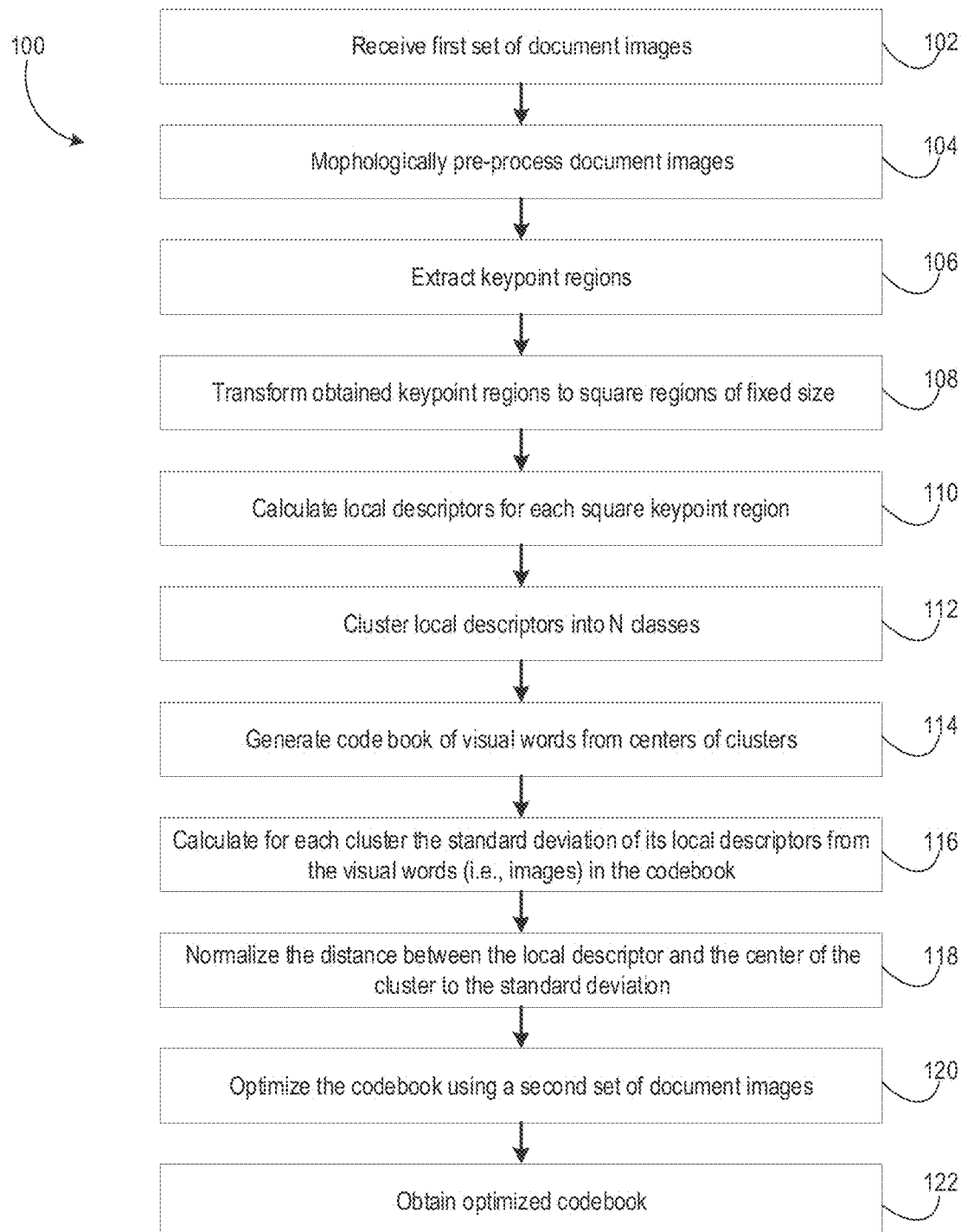
FIG. 1 is a flow diagram of a method of generating an optimized codebook in accordance with an implementation of the present disclosure.

Described herein are methods and systems for generating codebooks and using the codebooks for the detection of fields in document images. Information extraction from certain types of documents can be challenging due to the weakly-structured nature of such documents. Although an instance of a specific document type can contain a pre-defined set of document fields to be extracted (e.g., date, currency, or total amount), the positioning and representation of these fields is often not well-defined. However, documents issued by or obtained from a common source can have a particular layout.

Some approaches to information extraction often require large datasets of labeled images which may not feasible or practical to obtain for many real-life information extraction tasks. For example, convolutional neural networks (CNN) can be used for document segmentation and classification as well as for detecting text in natural scenes. However, the CNNs are usually trained on large explicitly labeled datasets with information about the targets (e.g., pixel level labels, bounding boxes, etc.).

The methods and systems of the present disclosure address the aforementioned drawbacks and challenges and present a novel approach for the extraction of information from documents based on the generation and use of optimized codebooks. The methods and systems described herein are capable of predicting positions of document fields (e.g., fields of interest also referred to herein as "target fields") in documents with previously unknown layouts, including documents of previously unknown types, with learning being performed on a small number of pre-labeled documents. As explained in more detail below, the novel approach is directed to extraction of fields of interest from document images such as invoices, receipts, identity cards, and other documents. However, the various implementations of the disclosure do not require large pre-labeled data sets for training and can be based simply on a given set of document images. Some of the methods disclosed herein can rely exclusively on the modality of document images, since the complex spatial structure of business documents can be clearly reflected in their image modality. Consequently, the methods and systems disclosed herein can be used independently as well as for facilitating mechanisms for information extraction processes based on optical character recognition (OCR) results or for facilitating training processes for neural networks.

The various implementations disclosed herein take into account the spatial structure of documents using an approach in computer vision called the Bag-of-Words (BoW) model. Although the BoW model can be used for natural image retrieval tasks and is based on a variety of keypoint detectors/descriptors, document images are distinctly different from natural scenes because document images have an explicit structure and high contrast resulting in the detection of numerous standard key regions. Furthermore, because some detected keypoints may not carry any particular semantic or structural meaning for the documents, the methods of the present disclosure specifically designed for document images make explicit use of document characteristics in their feature representations.

Accordingly, one of the main aspects of the present disclosure is the generation a codebook (which should be understood to be a dictionary of "visual words" as explained in more detail below) from a set of document images. The document-oriented codebook of visual words may be based on key regions and several types of compound local descriptors, containing both photometric and geometric information about the region. Accordingly, the codebook can be understood to include a set of visual words. The visual codebook can then be used to calculate statistical predicates for document field positions based on the spatial appearance of the visual words in a document image and on the correlations between visual words and document fields.

The location of a target field (i.e., a field of interest in a document) can be predicted through the use of conditional histograms collected at fixed locations of particular visual words. A prediction based on an integral predicate (i.e., an accumulated predicate) is calculated as a linear combination (e.g., a sum) of predictions of all the detected visual words.

Accordingly, implementations of the approaches described herein largely rely on modalities of document images since the complex spatial structure of documents such as business documents may be reflected by the modalities of the document images. The modality of the documents can be defined by characteristics of images such as the source of the image (e.g., photograph, scan, facsimile, mail etc.), the type of document (e.g., invoice, receipt, identity card, etc.), and the structure of the document (e.g., the presence of logical blocks, images, handwritten text, logos, fields, text etc.).

Aspects and implementations of the instant disclosure address the above noted and other deficiencies of the existing technology by providing efficient and computationally beneficial mechanisms for designing/generating a codebook of visual words and using the codebook for the detection and target fields in document images. This is generally accomplished by building a codebook of visual words (also referred to herein as a "visual codebook") from a bank or collection/set of documents and by applying the visual codebook to calculate statistical predicates for document field positions based on the spatial appearance of the visual words in the document image. Connected components extracted (e.g., by the MSER algorithm) from a set of morphologically preprocessed document images can be used as key regions (also referred to herein as "keypoint regions") in the implementations disclosed herein. Next, to generate a codebook, local descriptors can be calculated in such key regions using various different techniques. Local descriptors may be in the form of vectors of fixed dimension that describe the neighborhood surrounding a feature point or a keypoint of an image. The codebook includes the centers of clusters obtained for the local descriptors (such cluster centers are understood to be the "visual words" included in the codebook). Thereafter, the mutual information (MI) of two random variables, the position of a document field and the position of a particular visual word, can be used as a measure of relevance or predictive strength for that visual word. The integrated quality of the visual codebook can be estimated as the average value of MI over all visual words and can be used as a measure of effectiveness/quality in an assessment of the codebook. Target document field positions can be predicted via conditional histograms collected at the fixed positions of the individual visual words. The integrated prediction of field position is calculated as a linear combination of the predictions from all the individual visual words detected in the document image.

The systems and methods of the present disclosure are directed primarily to the generation of a codebook and its subsequent optimization as well as to the identification and extraction of fields using the optimized codebook.

In accordance with an implementation of the present disclosure, a method of building or generating an optimized codebook of visual words begins with receiving a first set of document images. Each document image in the received set of document images can then be morphologically preprocessed. Thereafter, the keypoint regions from a document image can be extracted and the regions can be combined and transformed into a square region. For each of the square regions, a set of local descriptors can then be generated. Subsequently, the local descriptors can be clustered into a set of classes, where the centers of the clusters are the visual words from which the codebook will be composed. Thereby, a codebook including a set of visual words from the first set of document images is generated. Then, for each cluster, a chosen statistical aggregate function (e.g., the standard deviation) of its local descriptors from the images (i.e., visual words) of the codebook can be calculated, and the distance between a descriptor and the center of a cluster can be normalized to the standard deviation. The obtained codebook can then be assessed and optimized using a second set of document images. The steps of the optimization method are outlined as follows.

Initially a codebook is generated as outlined above or a pre-existing codebook is received. Then, a second set of document images (i.e., an additional set of document images that is different from the first set of document images) is received. Thereafter, in each document image of the second set of document images, target fields can be labeled either automatically or by a user. Fields of a document should be understood to be areas in a document image where a particular type or category of information can be placed, found, or located (e.g., total, title, company, address, table etc.). From each of the labeled document images of the second set of document images, keypoint regions and their corresponding local descriptors can then be extracted. Subsequently, visual words can be detected by vector quantization of each local descriptor by using the nearest visual word of the codebook. Having detected the visual words from the second set of document images, conditional histograms of the positions of target fields can be calculated for each visual word. Then, the mutual information (MI) can be calculated between a particular target field and a particular visual word for all the fields and all the visual words. Lastly, by maximizing the objective function of MI results in the optimization of the codebook. The optimized codebook can be used to detect and extract fields from new document images, the method of which is outlined as follows.

Initially, an optimized codebook is received. Then a user can conduct a training of a model (e.g., implemented by a neural network) utilizing the codebook based on a new set of document images (e.g., a third set of document images that is different from each of the first set of document images and the second set of document images) also referred to herein as a set of "user documents". For each visual word of the optimized codebook, conditional histograms of the shift of the target field can be calculated. These conditional shift histograms are statistical histograms of the distributions of the position of the field relative to all the visual words of the codebook. Thereafter, a new (i.e., previously unseen) document image can be received for the detection or extraction of target fields and all of the visual words in the document image can be detected. On the basis of all the visual words, the statistical predicate of the possible position of the field can be calculated (i.e., an accumulated/integrated histogram of the distribution of the positions of the field can be obtained). In this manner, all the fields of interest can be detected on a new document image or a new set of document images.

The steps outlined above and their implementation by a system are described in more detail herein below with reference to FIGS. 1-9.

Starting with a detailed description of the generation of an optimized codebook, FIG. 1 depicts a flow diagram of a method 100 of generating an optimized codebook in accordance with an implementation of the present disclosure. In certain implementations, method 100 may be performed by a single processing thread executed by a processing device. Alternatively, method 100 may be performed by two or more processing threads executed by one or more processing cores, such that each thread would execute one or more individual functions, routines, subroutines, or operations of the method. In an illustrative example, the processing threads implementing method 100 may be synchronized (e.g., using semaphores, critical sections, and/or other thread synchronization mechanisms). Alternatively, the processing threads implementing method 100 may be executed asynchronously with respect to each other. Therefore, while FIG. 1 and the associated description lists the operations of method 100 in certain order, various implementations of the method may perform at least some of the described operations in parallel and/or in arbitrary selected orders.

To obtain a codebook, initially, in block 102, a first set of document images is received. The set of document images can include any number of document images. For example a set of document images having several thousand document images (e.g., 4000-8000 documents) can be sufficient.

At this point, in block 104, each document image from the first set of document images undergoes a process of morphological preprocessing for the detection of keypoint areas such as words, sentences, blocks of text, etc., (each respectively also referred to as a "keypoint regions" or "key region" in this disclosure). Morphological preprocessing can be the application of a collection of non-linear operations (e.g., erosion, dilation, opening, closing, etc.) related to the shape or morphology of features in an image. Morphological techniques can probe an image with a small shape or template called a structuring element which can be a small binary image (e.g., a matrix of pixels each with a value of 0 or 1). The structuring element can be positioned at various possible locations in the image and then compared with the corresponding neighborhood of pixels. Erosion with small square structuring elements can "shrink" an image by stripping away a layer of pixels from both the inner and outer boundaries of a region. After erosion, the holes and gaps between different regions can become larger, and small details can be eliminated. In contrast, dilation can have the opposite effect, as it adds a layer of pixels to both the inner and outer boundaries of regions. After dilation, gaps between different regions can become smaller, and small intrusions into boundaries of a region can be filled in.

Accordingly, the purpose of the morphological preprocessing, in black-and-white and grayscale images, is the gradual expansion of the text area (i.e., dark/black area) and conversely the decrease of the white/blank area not containing any text. Therefore if a signal of (1) is understood to indicate black text and a signal of (0) is understood to indicate a white/blank area, a dilation can be applied to erode the white area. Thus, there is a duality of morphological operations wherein the black areas expansion is directly correlated with the contraction of the white area. However, the general purpose of this stage is to expand the textual area in one way or another.

Having defined a center of the dilation, each iterative dilation step will result in a series of images, such that each subsequent image has more connected areas than the previous image. Accordingly, this would result in the erosion of white space in the image. Thus, if the original document image were to be binarized then the result would identify individual symbols (e.g., letters, numbers). Accordingly, the morphological dilation is iteratively applied over a number of predetermined thresholds, where the threshold values can be a number of times a morphological operation is applied or a resulting area encompassed by a region after the application of a morphological operation, (i.e., if the image initially includes individual characters such as number or letters, then the letters gradually meld into words, then into sentences, and then into separately laid out text blocks/paragraphs, thus resulting in a set of connected components (i.e., regions, areas) of different sizes. These components can contain various objects such as words, lines, letters, text blocks, etc. The thresholds can be measurement values of the areas of the connected components or the number of times the dilation operation is performed.

In block 106, the extraction of keypoint regions from the document images occurs. In one example, the keypoint regions can be the aforementioned connected components that are detected/extracted by an MSER detector from a set of preprocessed document images. Accordingly, to extract a keypoint region from a document image, an MSER detector can be applied to a document image after morphological preprocessing. More specifically, all the MSER regions detected on the original document image and on its copies obtained by a sequential application of an erosion or dilation operation can be combined to extract the keypoint regions. The MSER regions represent the connected components of a document image produced over all the possible thresholdings (i.e., the iterations of thresholds or morphological operation application described above) of the image. A connected component is a set of connected pixels that each share a specific property such as a color.

The detected key regions can correspond to the structural elements of the document (i.e. characters, words, lines, etc.). Combined with the aforementioned iterative preprocessing, the MSER algorithm can provide an efficient multi-scale analysis framework.

Figures 2A, 2B, 2C, 2D:
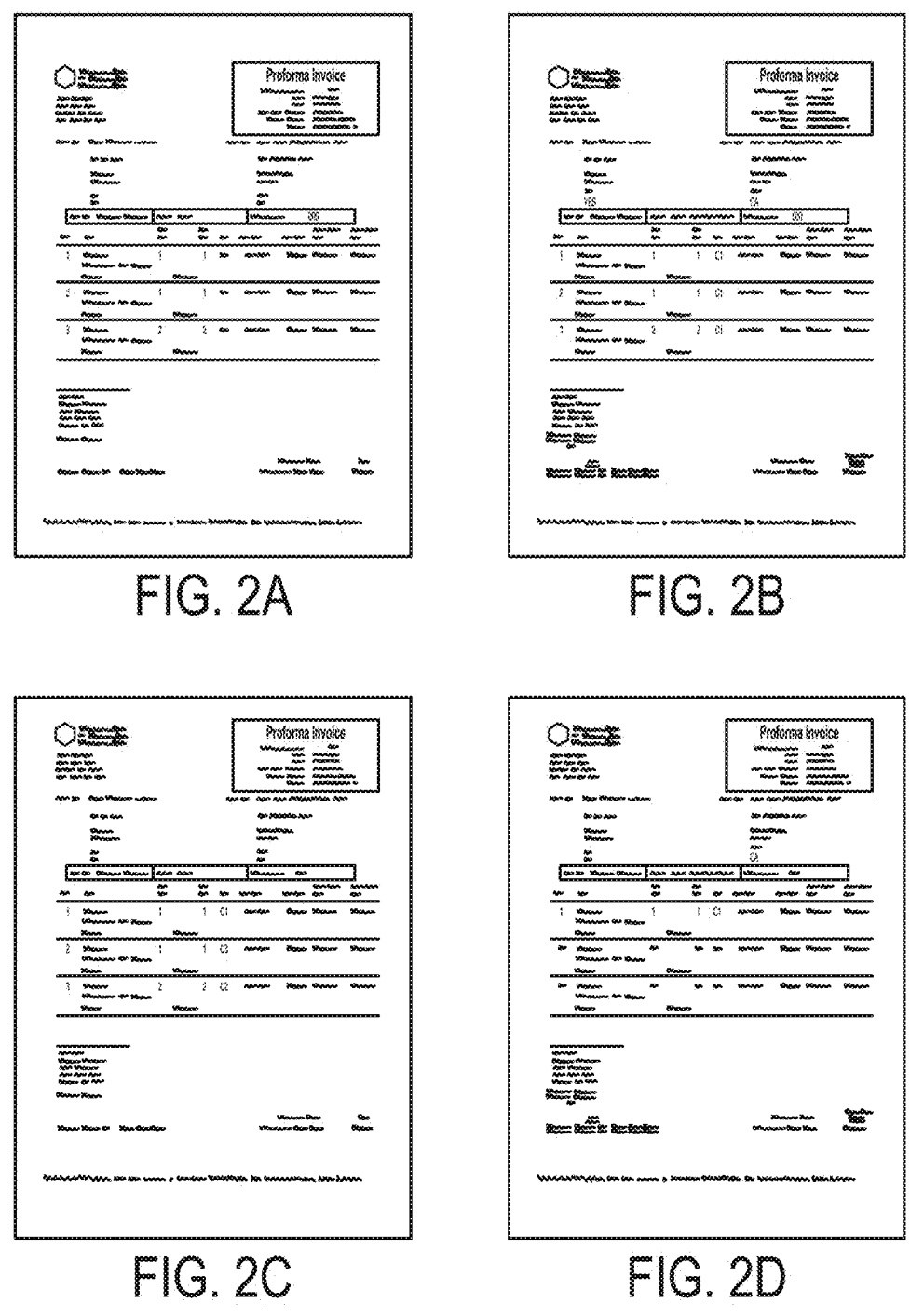

Examples of extracted rectangles of MSER regions of different sizes are shown in FIGS. 2A-2D which illustrate bounded rectangles of iteratively larger maximally stable extremal regions (MSER). FIG. 2A depicts an original document image, FIG. 2B depicts extracted MSERs having an area that is smaller than 0.005 of the image area, FIG. 2C depicts extracted MSERs having an area that is smaller than 0.01 of the image area FIG. 2D depicts extracted MSERs having an area that is smaller than 0.05 of the image area, in accordance with an implementation of the present disclosure. As can be seen, at each threshold value of the area MSER, with each iteration, the remaining white space in the document image decreases/erodes. With each iteration, the areas of the MSERs correspond to respectively larger elements (e.g., words, lines, blocks of text).

Turning back to FIG. 1, the extraction of keypoint regions in block 106 can be accomplished using approaches other than MSER such as the used of adaptive binarization. In the case of the use of an MSER algorithm, the connected components should be stable relative to some changes in the binarization thresholds. In other words, when a document image is binarized according to a particular set of thresholds, if within a certain range of thresholds a relatively invariant set of connected components appears (i.e., connected components that do not significantly change in size or area at the next threshold step, and are therefore invariant with respect to a subsequent application of a morphological operation), then that set of connected components is a stable set of components. In contrast, more "blurry" objects will result in having the areas of their respective connected components change more drastically with the application of each iterative threshold step.

Accordingly, if an object has well defined contours/boundaries, then in a particular range of thresholds, the connected components do not change. These stable components can be referred to as MSERs. Therefore, for each MSER there is a binarization threshold value, for which the relative change of the MSER area upon a change of a binarization threshold by a value A reaches a local minimum. In this case A is a parameter of an algorithm in accordance with an implementation of the present disclosure. Thus, all of the MSERs detected on an original document image (or a copy thereof) are connected, as a result of sequential/iterative application of the above described morphological operation (e.g., dilation/erosion).

Figure 3:
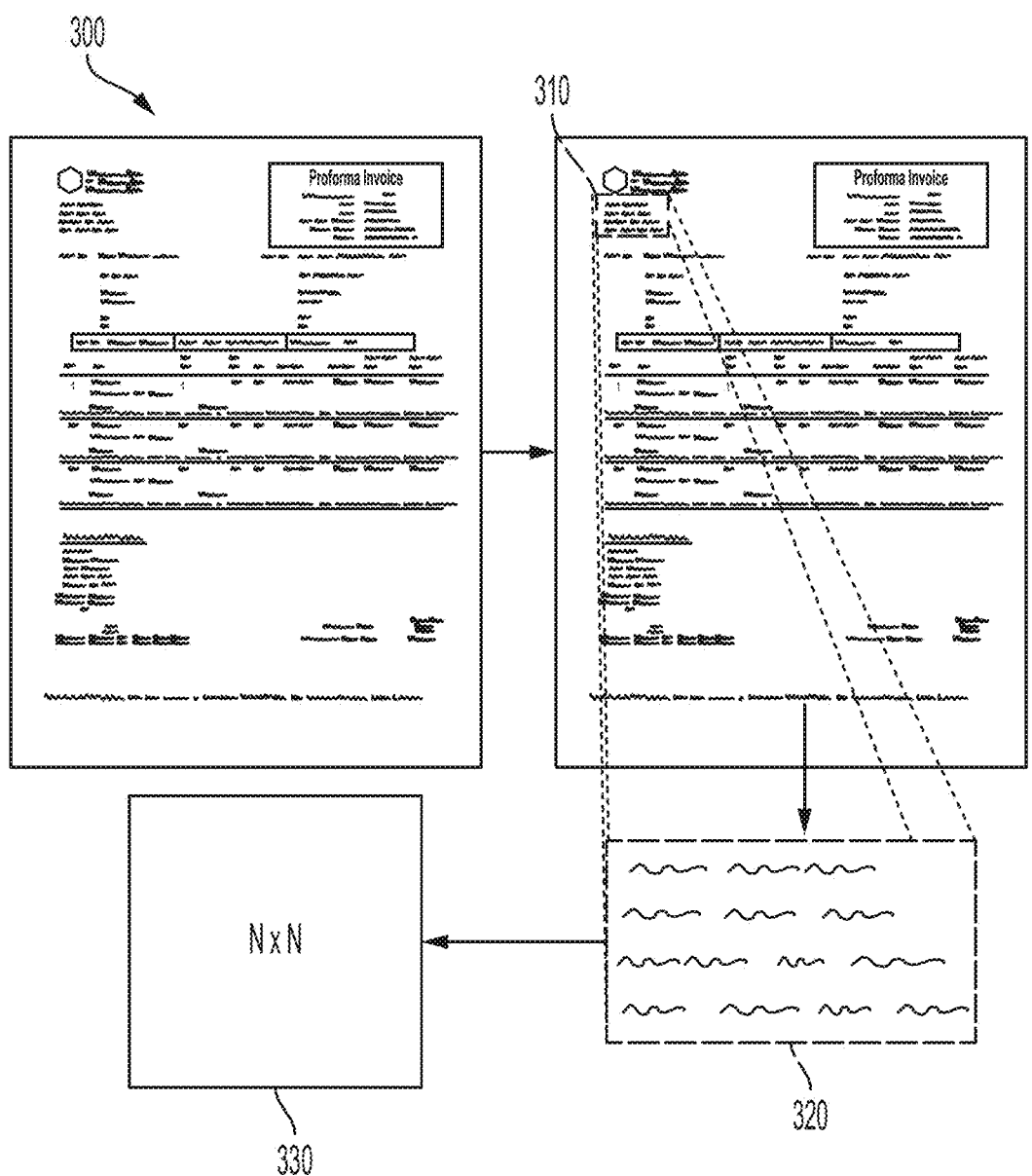
FIG. 3 is illustrates a transformation of a rectangular bounded MSER region to a square region, in accordance with some implementations of the present disclosure.
Figure 4:
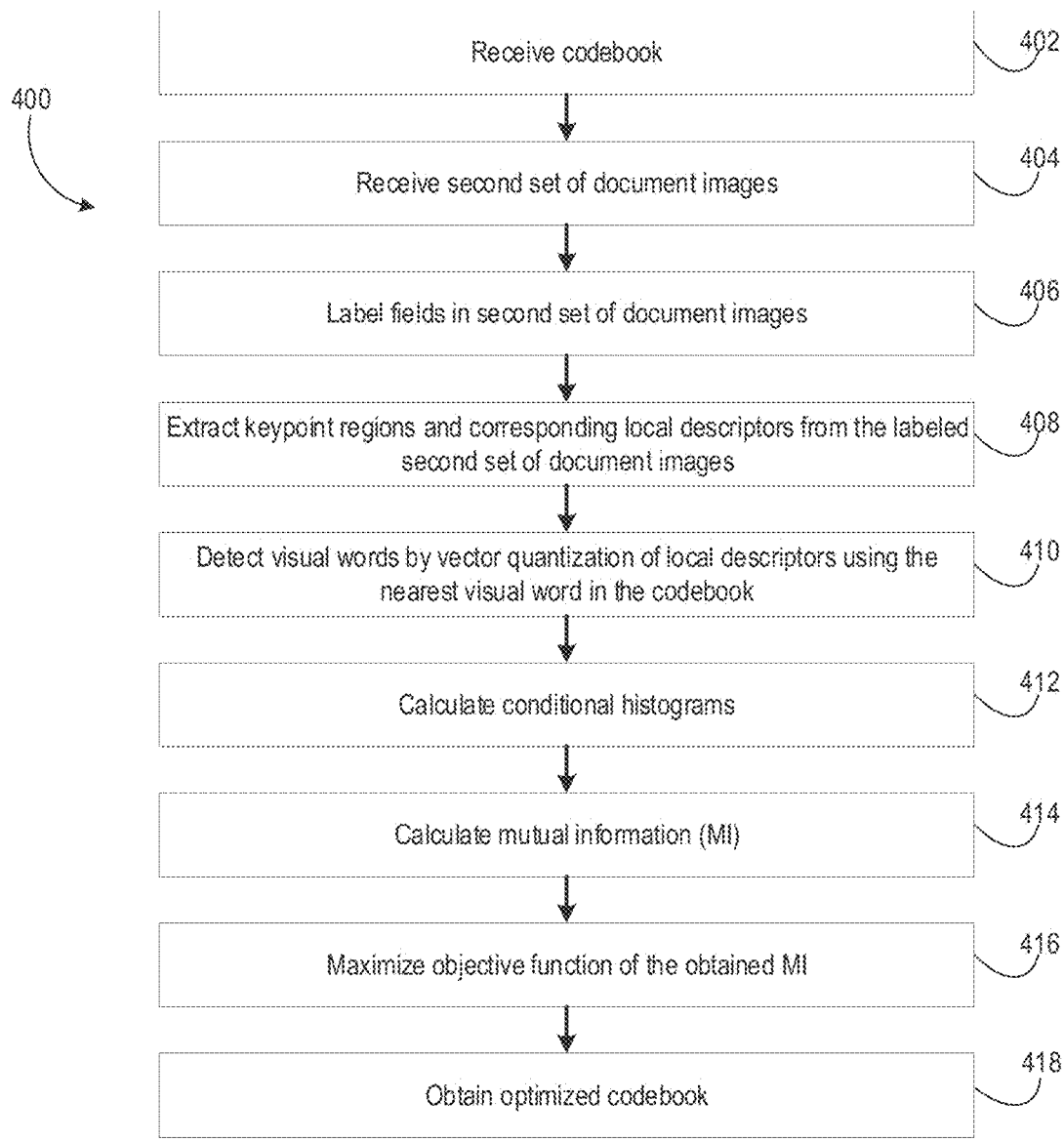
FIG. 4 is a flow diagram of a method of optimizing a codebook, in accordance with some implementations of the present disclosure.

Having obtained the MSERs, the local descriptors (vectors) for each of the region can be calculated. However, before local descriptors can be calculated, the keypoint regions may need to be transformed/normalized to a predetermined size. To do that in this implementation, a bounding rectangle/bounding box (also referred to herein as a bounded rectangular region) is generated for each extracted MSER. Then, each rectangular region of the document image is transformed, at block 108, into a corresponding square region of a predetermined fixed size (e.g., 16×16, 32×32, pixels or larger). FIG. 3 is illustrates a transformation of a rectangular bounded MSER region to a square region, in accordance with some implementations of the present disclosure. As schematically illustrated by FIG. 3, the MSER 310 is identified in the document image 300. The bounded rectangular region 320 is generated for the extracted MSER 310. Then, rectangular region 320 of the document image is transformed/normalized into a corresponding square region 330 of a predetermined fixed size.

Various local descriptors can be used in document image processing, both photometric and geometric. Examples of applicable photometric descriptors include, but are not limited to, speeded up robust features (SURF) descriptors, scale-invariant feature transform (SIFT) descriptors, Binary Robust invariant scalable keypoint (BRISK) descriptors, as well as descriptors composed using discrete Fourier transform (DFT) coefficients or discrete wavelet transform (DWT) coefficients.

The geometric descriptors can each include several components, including the size of the region, its aspect ratio, etc., and also include geometric relationships between neighboring areas/regions, analogous to the locally likely arrangement hashing (LLAH) method. It is important to note that various other heuristic or machine learning methods for obtaining descriptors of each MSER can be used without departing from the scope of the present disclosure.

In one implementation, a DFT is applied to the square region and the components/coefficient of the DFT are calculated. In another implementation the following photometric descriptors of extracted MSERs can be used: a SIFT descriptor, a SURF descriptor, two or more descriptors composed using DFT or DWT coefficients (where all descriptors are calculated for a grayscale image).

Moreover, the photometric descriptors can be concatenated with the geometric descriptors. As a result, in block 110, a set of local descriptors including, for example, several DFT components and two geometric descriptors, describing (a) an aspect ratio of the rectangle for which the descriptors are generated, and (b) the scale or size of the rectangle. In this manner, for each keypoint region, an optimal descriptor is calculated.

Thereafter, at the next stage, in block 112, the obtained local descriptors can be divided into or clustered into N classes/clusters/features by vector quantization. The quantization can be carried out by K-means clustering although other methods (e.g., using K-medoids, histogram binning, etc.) can also be applied. As noted earlier, the centers of each of the clusters will respectively serve as the visual words (W) for the subsequent analysis of the image. Thus, a codebook containing a set of visual words (W) is created in block 114.

In block 116, for each cluster, the standard deviation of its local descriptors from the codebook images is calculated.

In block 118, the distance between the descriptor and the center of the cluster can be normalized by the standard deviation, so that the Euclidean distance may be used later on when detecting visual words.

At this point it is important to note that in the aforementioned stages, the first set of document images is used only once in the development/creation/generation of the visual codebook. The resulting codebook can be used for analyzing a large variety of types of documents and not only those had the samples of which served as the basis for generating the codebook. Accordingly, a universal codebook can be generated using a large database of a variety of different types of documents.

In block 120, the effectiveness or quality of the predictive strength of the codebook relative to target fields can be assessed and the codebook can be optimized using a second set of document images. In general, the purpose of the optimization of the codebook is to ensure maximum mutual information (MI) for the position of a target field (F) relative to a visual word (W). To do this, it may be useful to calculate the mutual information between two random variables. In this case, there exist two independent variables, F and W respectively, which have independent distributions and for which the MI between these variables can be calculated. The aforementioned MI can be obtained using a set of distribution histograms of the location of the field relative to a visual word found in a given document image. The main steps of the method of codebook optimization 400 is depicted in the flow diagram of FIG. 4 and is described in more detail below.

In certain implementations, method 400 may be performed by a single processing thread executed by a processing device. Alternatively, method 400 may be performed by two or more processing threads executed by one or more processing cores, such that each thread would execute one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other. Therefore, while FIG. 4 and the associated description lists the operations of method 400 in certain order, various implementations of the method may perform at least some of the described operations in parallel and/or in arbitrary selected orders.

In accordance with one implementation of the present disclosure, initially a codebook is generated or a pre-existing codebook is received in block 402. Then, to assess the quality of the generated code book another set of document images can be used. Accordingly, in block 404 a second set of document images is received. This additional set of document images can, for example, be comprised of 100, 500, 1000, 1200, or more document images that differ from the document images used for the generation of the code book. It should be noted that any number of document images can be used for this purpose. In another implementation a set of 1000 documents images (e.g., invoice images) which are different from the document images used to create the codebook can be used.

Thereafter, in block 406, important fields (i.e., target fields) in the set of document images such as "Date", "Total", "Company", "Currency" etc. can be automatically labeled, depending on the importance of the fields, if they are not already labeled upon being received. However, the document images can also be labeled by a user in accordance with an implementation. For example, in another implementation, important fields such as "invoice date" and "total" can be explicitly labeled in advance.

Next, in block 408, from each document image in this second set of document images, all the key regions and their corresponding local descriptors are extracted. This can occur in a manner analogous to the steps described earlier for the generation of the codebook.

Each extracted local descriptor is then vector-quantized, in block 410, using the nearest visual word in the codebook (i.e., the nearest center of a cluster obtained when creating the codebook). This procedure can be referred to as "visual word detection." In this manner, the detection of all available visual words W is realized from the second set of document images.

Next, block 412 includes calculating a two-dimensional histogram $h(W_i, W_j)$ of coordinates $(W_i, W_j)$ for a particular visual word W. It can also include calculating a two-dimensional histogram $h(F_i, F_j)$ of coordinates $(F_i, F_j)$ for a particular labeled field F. From there, the following conditional histograms can be calculated: (a) a conditional histogram $h(F_i, F_j|W_k, W_l)$ of the position for the field F under the fixed position $(W_k, W_l)$ for the visual word W, and (b) a conditional histogram $h(W_i, W_j|F_k, F_l)$ of the position for the word W under the fixed position $(F_k, F_l)$ for the field F.

Bin values of the two-dimensional histograms can be calculated for the cells from a grid of M×N elements. In one implementation, M and N can be set to any predetermined value such as M=N=16, M=N=32, M=N=64, M=N=128, and other values can be used for the M×N grid.

Once the aforementioned histograms are obtained, at the next stage, in block 414, the mutual information MI (W, F) of two random variables, the position of the document field F and the position of the visual word W, can be calculated. The MI of two random variables, the position of the document field F, and the position of the word W, is a measure of the mutual dependence between the two variables. The MI can be calculated in accordance with the formula MI (W, F)=H(F)−H(F|W)=H(W)−H(W|F), where (a) H(F), H(W) are the marginal entropies of random positions F and W, calculated using the histograms $h(F_i, F_j)$ and $h(W_i, W_j)$; (b) H(F|W) is the conditional entropy of F given that the value of W is known, calculated using the conditional histogram $h(F_i, F_j|W_k, W_l)$ and subsequent averaging of the result over all possible positions $(W_k, W_l)$; and H(W|F) is the conditional entropy of W given that the value of F is known, calculated using the conditional histogram $h(W_i, W_j|F_k, F_l)$ and subsequent averaging of the result over all possible positions $(F_k, F_l)$.

Because MI is a measure of the mutual dependence between the two variables, if MI is averaged over all the visual words in the codebook, the MI can be used as an integrated quality measure of the codebook for a particular document field F. Consequently, the MI can be calculated for all target document fields F. Accordingly, in block 416, the objective function of the obtained MI can be maximized to optimize the codebook and generate an optimized codebook in block 418.

In some implementations, maximization of the mutual information can be performed automatically (e.g., using the gradient descent, differential evolution, or other suitable optimization technique). Alternatively, maximization of the mutual information can involve exhaustive search of parameters or grid search, in which case, the difference between the unconditional histogram of two random variables and the conditional histogram is calculated. Thus, the total two-dimensional entropy should be decremented by the entropies obtained with fixed visual words. Then, the decrease in entropy is determined (i.e., how much random fluctuations of the fields F would be decrease with fixed visual words W).

For various cases and sets of documents it is possible to select the optimum values of the necessary parameters to achieve the desired optimization. For example it is possible to select the number of visual words needed to be contained in the codebook, the number and kind of descriptors used, the number of sizes/aspects taken, the type of pre-processing, the weights of the descriptors, etc. to maximize the objective function of the MI in block 416.

It is important to note that the aforementioned process of optimizing the codebook using a number of labeled document images of a second set of document images (e.g., invoices) is conducted only once at the development stage of generating an optimized codebook. Thus, at block 418 an optimized codebook of visual words is obtained, that is created based on a first set of document images and optimized based on a second set of document images, and is ready to be implemented by a used for the detection and extraction of important fields on a document image. The method of implementing the optimized codebook is described in more detail with reference to FIG. 5 and FIG. 6.

Figure 5:
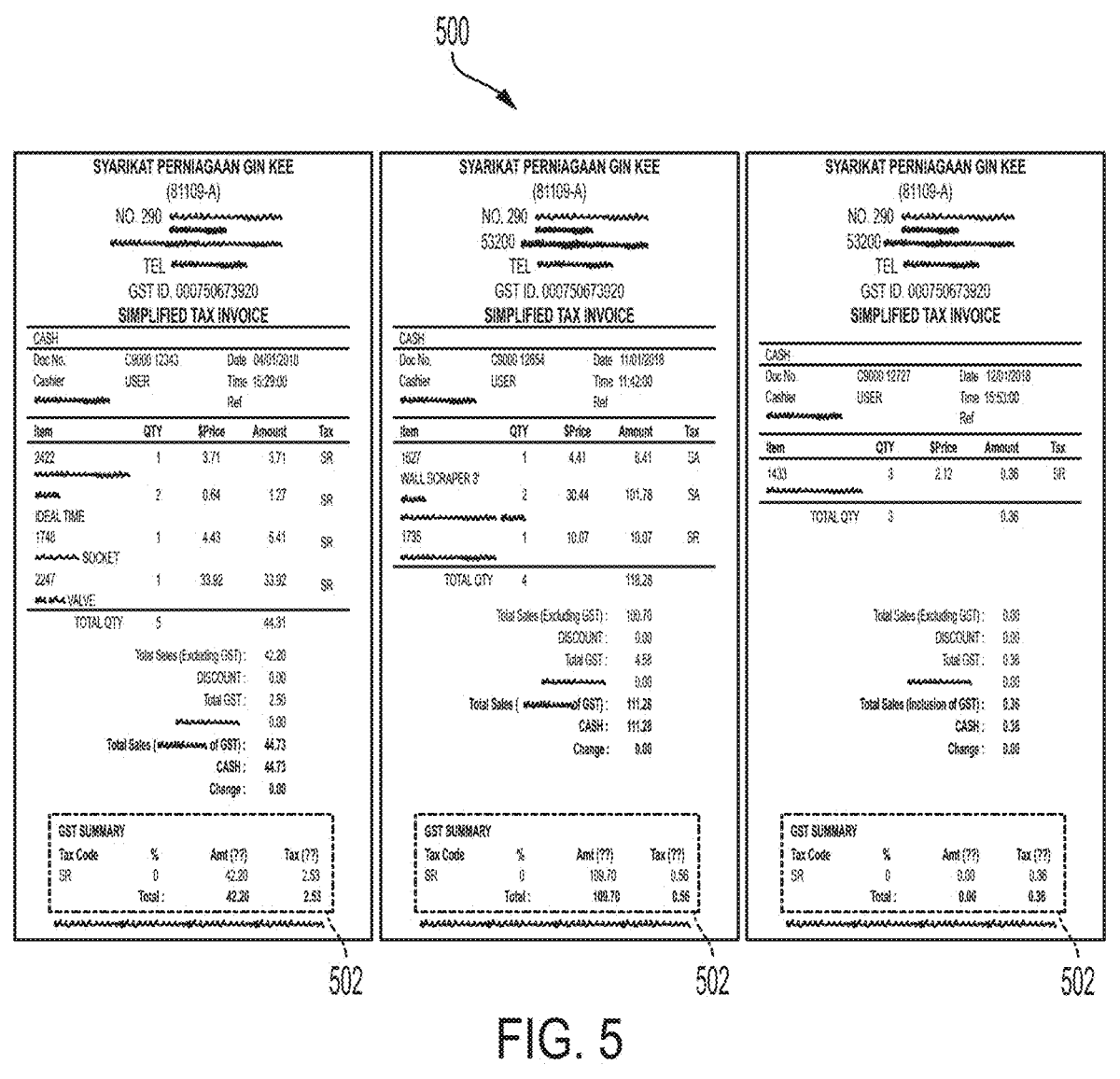
Figure 6:
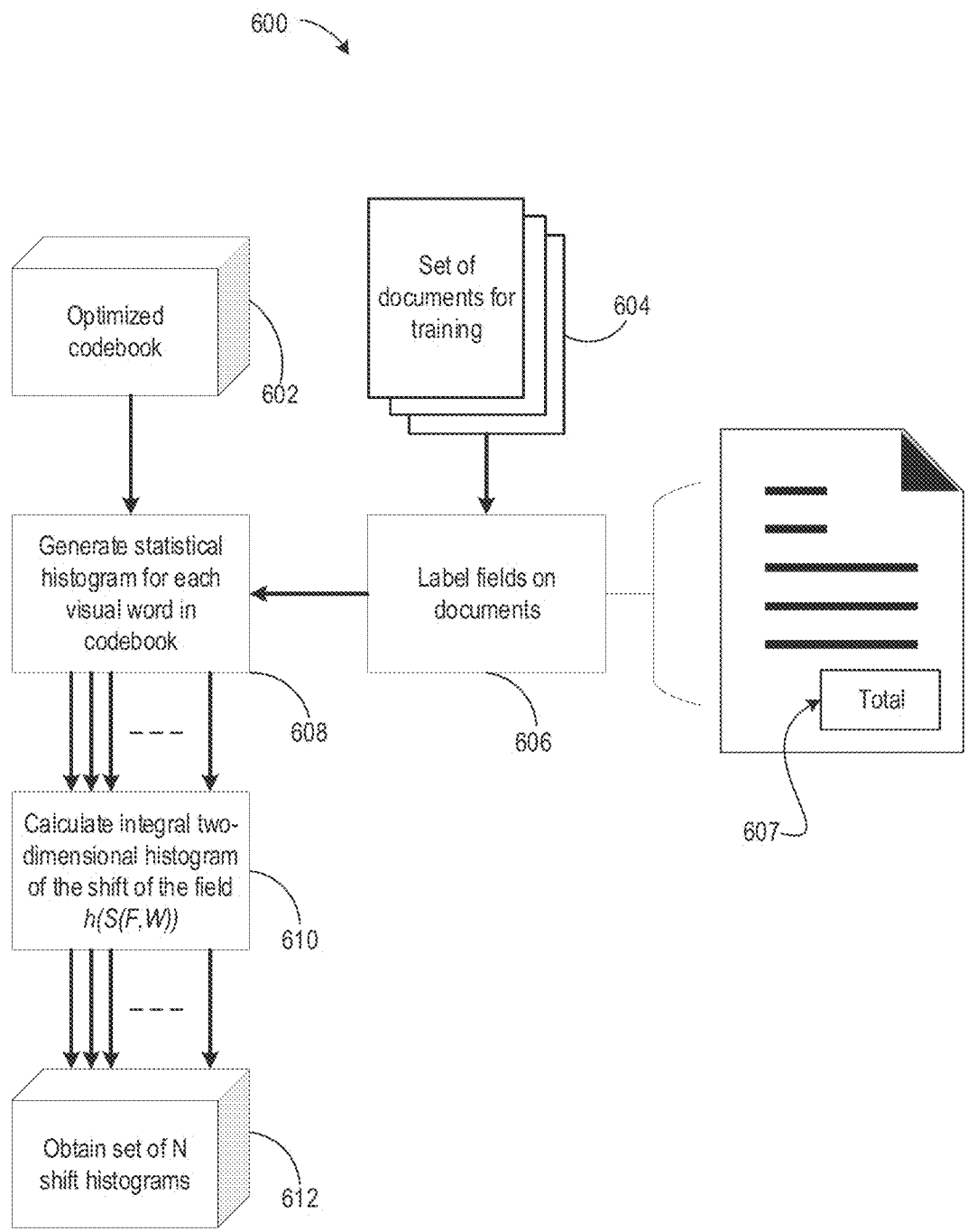
FIG. 6 is a block diagram of a training method of obtaining a set of data to extract fields from new document images, in accordance with some implementations of the present disclosure.

In some implementations, the use of the optimized codebook includes a training method depicted in FIG. 6 based on a set of document images such as the one depicted in FIG. 5. Accordingly, FIG. 5 is illustrates a set of document images with low layout variability and FIG. 6 is a block diagram of a training method 600 for obtaining a set of data to extract fields from new document images, in accordance with some implementations. In certain implementations, method 600 may be performed by a single processing thread executed by a processing device. Alternatively, method 600 may be performed by two or more processing threads executed by one or more processing cores, such that each thread would execute one or more individual functions, routines, subroutines, or operations of the method. In an illustrative example, the processing threads implementing method 600 may be synchronized (e.g., using semaphores, critical sections, and/or other thread synchronization mechanisms). Alternatively, the processing threads implementing method 600 may be executed asynchronously with respect to each other. Therefore, while FIG. 6 and the associated description lists the operations of method 600 in certain order, various implementations of the method may perform at least some of the described operations in parallel and/or in arbitrary selected orders.

In one implementation of the present disclosure, yet another set of document images 604 (i.e., the third set of document images, the set of user documents) is received including a small number of document images (e.g. 3, 5, 10, or any number of document images) relative to the first set of document images and the second set of document images described earlier. In block 606, the key or important fields in the document images are labeled, either by a user or by an automatic process. Notably, each document image can have one or more fields labeled thereon and each field can be labeled in a similar or analogous manner. For example, the receipts in the set of document images 500 in FIG. 5 have the "Total" field 502 labeled.

Then, using the optimized codebook 602, a histogram can be generated reflecting the frequency distribution of the position of this field (e.g., the "Total" field 607) relative to all the visual words of the codebook. The histogram is generated for each visual word of the codebook regardless of whether or not it is found the particular document image being analyzed. Accordingly, if a codebook includes 500 visual words, then 500 histograms will be generated at this stage in block 608.

If a visual word does exist in the particular document image that is being analyzed, then the visual word will have characteristics such as: geometric location, center of the visual word, etc. There will also be a labeled field (e.g., the "Total" field) which is characterized by its location in the document image. Therefore, there will be a spatial difference between the location of the field and the location of the visual word.

Accordingly, in block 608, for each visual word from the codebook a conditional histogram $h(F_i, F_j|W_k, W_l)$ of the position for the particular field F under the fixed position $(W_k, W_l)$ for the visual word W over the labeled set of document images (i.e., the third set of document images obtained for training the model) can be calculated. However, when calculating this histogram, a shift S of the field F position relative to the fixed position of the word W for spatial coordinates is used. This procedure of calculating a conditional histogram is repeated for all the visual words in the codebook. Thereby, a plurality of such shift distribution histograms are obtained. It is also important to note that the shift of each document image will be its own (i.e., different, unique) but can generally be correlated in some manner. In other words, the conditional histograms can indicate approximately where the target field can be found relative to each visual word.

Figure 7:
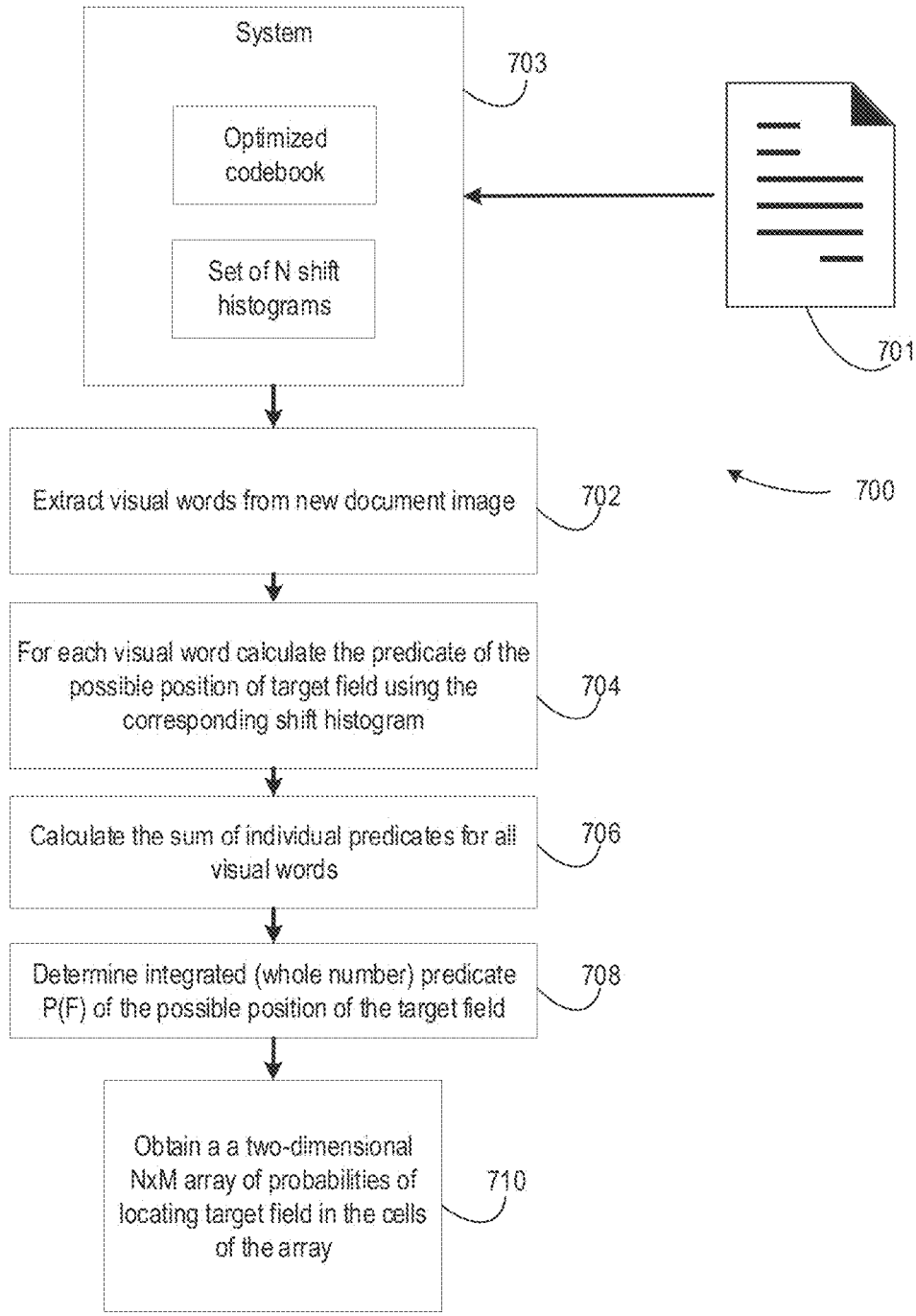
FIG. 7 is a flow diagram of a method of detecting a target field in a new document image, in accordance with some implementations of the present disclosure.

Then, in block 610, the integral two-dimensional histogram $h(S(F, W))$ of the shift S of the position of the field F that will incorporate the shifts relative to all the possible positions of visual word W in the labeled dataset can be calculated to obtain a set of N shift histograms in block 612. The set of N shift histograms $h(S(F, W_j))$ for all the visual words $W_j$ together with the codebook itself, comprise the complete data set which is sufficient to calculate statistical predicates of invoice fields positions in accordance with implementations of the present disclosure. Using the noted complete data set, a statistical predicate $P(F_j)$ for the location of field $F_j$ can be calculated for any document image loaded into the system in accordance an implementation. The use of the predicate is depicted in FIG. 7 which is a flow diagram of a method of detecting 700 a target field in a new document image.

In certain implementations, method 700 may be performed by a single processing thread executed by a processing device. Alternatively, method 700 may be performed by two or more processing threads executed by one or more processing cores, such that each thread would execute one or more individual functions, routines, subroutines, or operations of the method. In an illustrative example, the processing threads implementing method 700 may be synchronized (e.g., using semaphores, critical sections, and/or other thread synchronization mechanisms). Alternatively, the processing threads implementing method 700 may be executed asynchronously with respect to each other. Therefore, while FIG. 7 and the associated description lists the operations of method 700 in certain order, various implementations of the method may perform at least some of the described operations in parallel and/or in arbitrary selected orders.

To detect or extract a target field in a new document image, first a new document image 701 is sent or loaded into the system 703 that includes the optimized codebook and the set of N shift histograms. Initially, at block 702 the system detects, in the new document image, all the visual words W which are present in the codebook. For example, 20 words, 200 words, or any number of words can be found (depending on the number of words that are included in the optimized codebook of the system 703). Then, in block 704, for each instance of the codebook visual word $W_k$, the system can calculate the predicate $P_{ik}(F)$ of the possible position of the field F using the appropriate corresponding shift histogram $h(S(F, W_k))$, stored in the system together with the codebook. The integral predicate $P_k(F)$ of the possible position of the filed F based on all the instances of the visual word $W_k$ is calculated, in block 708, from the sum of the individual predicates $P_{ik}(F)$ obtained in block 706 for all the instances of the visual word $W_k$ in the document image. More specifically, in some implementations, all the histograms are laid or accumulated on top of each other with the consideration of each of their respective shifts. Consequently, this results in an accumulated distribution histogram obtained from all of the visual words.

Note that for an instance of the visual word $W_k$ in the document image, a portion of the shift histogram $h(S(F, W_k))$ may not contribute to the calculation of the predicate for this visual word. This is because big shifts may result in a field F position estimation, which lies outside of the area of the document image.

The integral predicate P (F) of the possible position of the field F based on the appearance of all the visual words in the document image may be calculated as a linear combination of the individual predicates $P_k(F)$ from the various visual words $W_k$ detected in the document image. Note that individual predicates based on individual visual words may in some cases not predict the position of a field with a desired level of accuracy, but an integral predicate, calculated over all the instances of all the visual words detected on a document image, should perform sufficiently well.

It should therefore be noted that prediction of field locations in a document image can be further optimized (e.g., for improved precision), if the integral predicate for field F is calculated, for example as a linear combination of predicates from individual words with their respective weights, equaling the values of MI (F, $W_k$) for the individual words $W_k$, to being squared (i.e., raised to the second power). Such statistical predicates, regardless of how they are calculated (i.e., in the manner described in the previous paragraph, in the manner described in this paragraph, or otherwise), can be represented as M×N array of probabilities of locating target field in the cells of the array, in block 710, and are shown in more detail in FIG. 8.

Figure 8:
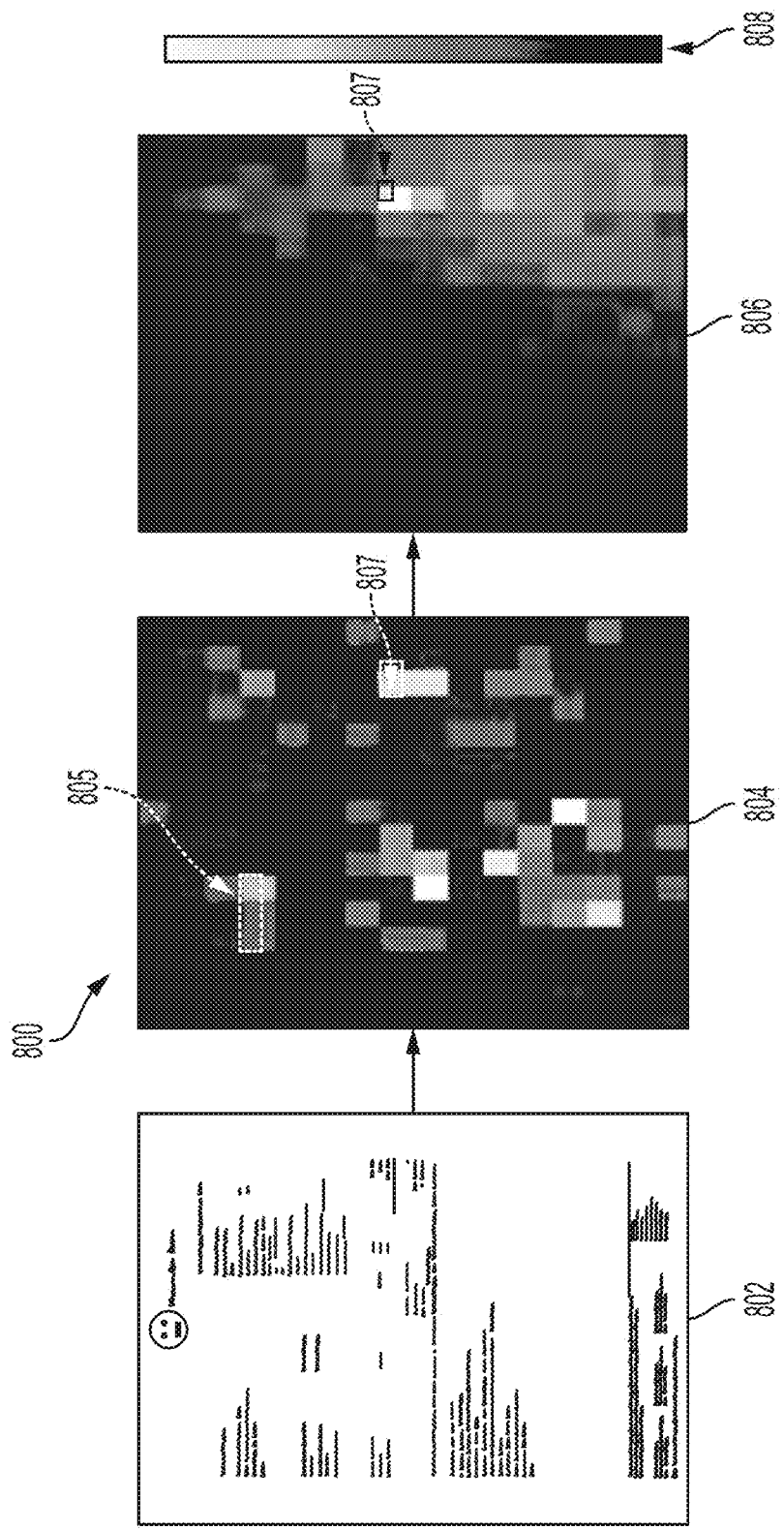
FIG. 8 illustrates a block diagram showing the generation of statistical predicates for a target field in a document image, in accordance with some implementations of the present disclosure.

FIG. 8 illustrates a block diagram 800 showing the generation of statistical predicates for a target field in a document image, in accordance with some implementations of the present disclosure. The superimposition/overlay of an individual statistical predicate 804 based on a particular visual word, and an integral statistical predicate 806 (i.e., an accumulated histogram) over an original document image 802 can be seen in FIG. 8. The obtained statistical predicate P (i, j|F) is a two-dimensional array of the probabilities of the document field F appearing in different cells (i, j) of the spatial grid M×N imposed on the image 802. The gradient bar 808 indicates the shading used for the various values of the predicate (with 0 being at the bottom of the gradient bar and the highest value being at the top). When calculating histograms using the dataset of labeled document images, we assume that a particular cell contains the field F (or the word W) if the center of the field's rectangle 807 or word's rectangle 805 is located inside the cell. Notably, M and N can be any values suitable for the document images being analyzed. For example for checks, a 26×10 array of may be appropriate, while for bills a 16×16 array may be more appropriate etc. Accordingly, the space/area of the document image is quantized by coordinates into a predefined number of cells and this division into cells creates the final histogram.

The prediction of the position of a field F may be determined by the position of the elements of the predicate array with top n values. Each cell of the histogram can contain some number of "votes" (i.e., accumulated frequency) from the visual words. Thus, the cell which contains the maximum collection of votes represents the top-1 prediction. The grid cells containing n maximum values of the predicate P(i; j|F) can be referred to as "top-n cells", and, for example, any of top-1 through top-5 accuracies can be used to find a field in a document. For example, in accordance with some implementations, the following metrics can be used to measure the accuracy of the prediction: top-1 accuracy, which is the percentage of correct predictions based on the grid cell with the top value of the statistical predicate P(i; j|F); top-3 accuracy, which is the percentage of correct predictions based on the grid cells with top 3 values of the statistical predicate P(i; j|F); and top-5 accuracy, which is the percentage of correct predictions based on the grid cells with top five values of the statistical predicate P(i; j|F).

There will be as many histograms as there are target fields on a document. That is if there are N fields, then there will be N predicates. For example, let's assume that the codebook is composed of 800 visual words while 200 visual words filled 200 of the 800 histograms across all visual words. All of these 800 histograms would then be taken and accumulated together, with their relative positions in the document being taken into account, to receive one prediction of one field for all 800 histograms. This is a tensor of 800×N histograms where for each of the N fields' 800 histograms are calculated, and added with their mutual relative positions to obtain the statistical predicate. When N such statistical predicates are obtained, it is possible to predict the location for all N fields. In this manner, the location of each target field (i.e., field of interest, important field) in a document image can be predicted.

The improved accuracy can be obtained when the variations in the layout of the new type of document to which the codebook is desired to be applied are minimized. In other words, if the codebook is applied to a set of document images of a type with limited layout variability, there can be a significant accuracy improvement. For example due to wrinkling the location of fields on receipts can change drastically. However, if the document images (e.g. receipt images) are more flat/even, then the resulting accuracy of the prediction of field location will be very high relative to the foregoing example.

Accordingly, to improve speed and accuracy in some implementations a set of document images can be divided into groups in accordance with visual similarity (e.g., by similarity of layout) either manually or through known automatic methods. For example, if before loading the document images into the system a user can divide the document images (e.g., according to type of document, source company, etc.) such that each group of document images are visually similar (i.e., have a similar layout), the process of extracting fields within each group of document images will be several times more accurate.

Figure 9:
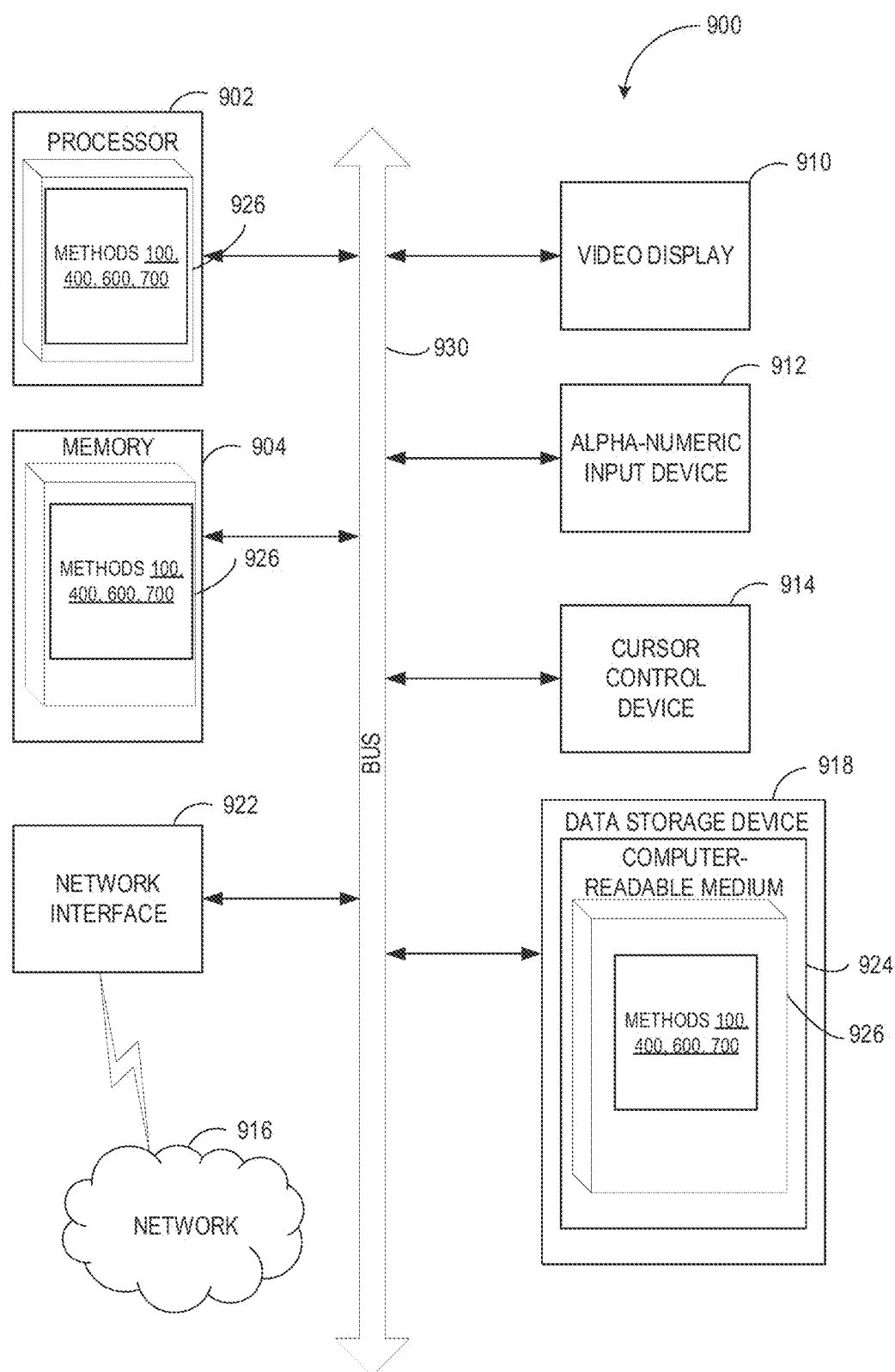
FIG. 9 illustrates a block diagram of a computer system, in accordance with some implementations of the present disclosure.

FIG. 9 illustrates a block diagram of a computer system, in accordance with some implementations of the present disclosure. FIG. 9 depicts an example computer system 900 which can perform any one or more of the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a Personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 900 includes a processing device 902, a main memory 904 (e.g., read-only memory (ROM), flash memory, dynamic random access memory (DRAM) such as synchronous DRAM (SDRAM)), and a data storage device 918, which communicate with each other via a bus 930.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an application specific integrated circuit (ASIC), a field programmable gate array (FPGA), a digital signal processor (DSP), network processor, or the like. The processing device 902 is configured to execute instructions 926 for implementing the methods described herein, such as the generation 100 of the codebook of FIG. 1, the morphological preprocessing and transformation of FIGS. 2-3, the optimization 400 of FIG. 4, the training process 600 of FIG. 6, and/or the detection/extraction 700 of FIG. 7 and to perform the operations discussed herein.

The computer system 900 may further include a network interface device 922. The computer system 900 also may include a video display unit 910 (e.g., a liquid crystal display (LCD) or a cathode ray tube (CRT)), an alphanumeric input device 912 (e.g., a keyboard), and a cursor control device 914. In one illustrative example, the video display unit 910, the alphanumeric input device 912, and the cursor control device 914 may be combined into a single component or device (e.g., an LCD touch screen).

The data storage device 918 may include a computer-readable medium 924 on which is stored the instructions 926 embodying any one or more of the methodologies or functions described herein. The instructions 926 may also reside, completely or at least partially, within the main memory 904 and/or within the processing device 902 during execution thereof by the computer system 900. The main memory 904 and the processing device 902 also constitute computer-readable media. In some implementations, the instructions 926 may further be transmitted or received over a network 916 via the network interface device 922.

While the computer-readable storage medium 924 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method, comprising:
  receiving, by a processing device, a codebook comprising a set of visual words, each visual word corresponding to a center of a cluster of local descriptors, wherein each local descriptor is associated with a keypoint region of a first set of document images;
  calculating, based on a second set of document images, for each visual word of the codebook, a respective frequency distribution of a field position of a specified field with respect to the visual word;
  loading a document image for extraction of target fields;
  calculating a statistical predicate of a possible position of a target field in the document image based on the frequency distributions; and
  detecting fields in the document image based on the calculated statistical predicate.

2. The method of claim 1, wherein the codebook is optimized on a third set of document images.

3. The method of claim 1, wherein calculating the respective frequency distribution comprises calculating an integral two-dimensional histogram of shift of a position of the specified field, and wherein the integral two-dimensional histogram incorporates a plurality of shifts relative to possible positions of each visual word.

4. The method of claim 1, wherein calculating the statistical predicate further comprises:
  obtaining an accumulated distribution histogram based on possible positions of the target field with respect to two or more visual words of the set of visual words.

5. The method of claim 1, wherein a plurality of document images of the second set of document images have a similar layout.

6. The method of claim 1, further comprising:
  dividing the second set of document images into groups based on document similarity prior to at least one of: training a model or using the model.

7. The method of claim 1, wherein the statistical predicate is represented by a linear combination of individual predicates corresponding to a plurality of visual words detected in the document image.

8. A system, comprising:
  a memory; and
  a processing device coupled to the memory, the processing device configured to:
    receive a codebook comprising a set of visual words, each visual word corresponding to a center of a cluster of local descriptors, wherein each local descriptor is associated with a keypoint region of a first set of document images;
    calculate, based on a second set of document images, for each visual word of the codebook, a respective frequency distribution of a field position of a specified field with respect to the visual word;
    load a document image for extraction of target fields;
    calculate a statistical predicate of a possible position of a target field in the document image based on the frequency distributions; and
    detect fields in the document image based on the calculated statistical predicate.

9. The system of claim 8, wherein the codebook is optimized on a third set of document images.

10. The system of claim 8, wherein calculating the respective frequency distribution comprises calculating an integral two-dimensional histogram of shift of a position of the specified field, and wherein the integral two-dimensional histogram incorporates a plurality of shifts relative to possible positions of each visual word.

11. The system of claim 8, wherein calculating the statistical predicate further comprises:
obtaining an accumulated distribution histogram based on possible positions of the target field with respect to two or more visual words of the set of visual words.

12. The system of claim 8, wherein a plurality of document images of the second set of document images have a similar layout.

13. The system of claim 8, wherein the processing device is further configured to:
dividing the second set of document images into groups based on document similarity prior to at least one of: training a model or using the model.

14. The system of claim 8, wherein the statistical predicate is represented by a linear combination of individual predicates corresponding to a plurality of visual words detected in the document image.

15. A non-transitory computer-readable storage medium comprising executable instructions that, when executed by a processing device, cause the processing device to:
receive a codebook comprising a set of visual words, each visual word corresponding to a center of a cluster of local descriptors, wherein each local descriptor is associated with a keypoint region of a first set of document images;
calculate, based on a second set of document images, for each visual word of the codebook, a respective frequency distribution of a field position of a specified field with respect to the visual word;
load a document image for extraction of target fields;
calculate a statistical predicate of a possible position of a target field in the document image based on the frequency distributions; and
detect fields in the document image based on the calculated statistical predicate.

16. The non-transitory computer-readable storage medium of claim 15, wherein the codebook is optimized on a third set of document images.

17. The non-transitory computer-readable storage medium of claim 15, wherein calculating the respective frequency distribution comprises calculating an integral two-dimensional histogram of shift of a position of the specified field, and wherein the integral two-dimensional histogram incorporates a plurality of shifts relative to possible positions of each visual word.

18. The non-transitory computer-readable storage medium of claim 15, wherein calculating the statistical predicate further comprises:
obtaining an accumulated distribution histogram based on possible positions of the target field with respect to two or more visual words of the set of visual words.

19. The non-transitory computer-readable storage medium of claim 15, wherein a plurality of document images of the second set of document images have a similar layout.

20. The non-transitory computer-readable storage medium of claim 15, further comprising:
dividing the second set of document images into groups based on document similarity prior to at least one of: training a model or using the model.

* * * * *